(12) United States Patent
Krause et al.

(10) Patent No.: US 11,216,407 B2
(45) Date of Patent: Jan. 4, 2022

(54) SINGLE COMMUNICATION INTERFACE AND A METHOD WITH INTERNAL/EXTERNAL ADDRESSING MODE

(71) Applicant: SHENZHEN GOODIX TECHNOLOGY CO., LTD., Guangdong (CN)

(72) Inventors: Markus Krause, Dresden (DE); Martin Froehlich, Dresden (DE)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/943,169

(22) Filed: Jul. 30, 2020

(65) Prior Publication Data

US 2020/0356501 A1 Nov. 12, 2020

Related U.S. Application Data

(63) Continuation of application No. PCT/CN2019/075725, filed on Feb. 21, 2019.

(30) Foreign Application Priority Data

Nov. 27, 2018 (EP) .................................... 18208636

(51) Int. Cl.
*G06F 13/42* (2006.01)
*G06F 13/20* (2006.01)

(52) U.S. Cl.
CPC .......... *G06F 13/4282* (2013.01); *G06F 13/20* (2013.01); *G06F 2213/0002* (2013.01); *G06F 2213/0052* (2013.01)

(58) Field of Classification Search
CPC ...... G06F 13/20; G06F 13/28; G06F 13/4282; G06F 13/4291; G06F 2213/0002; G06F 2213/0052
See application file for complete search history.

(56) References Cited

U.S. PATENT DOCUMENTS 7,076,584 B2 7/2006 Deur et al.
10,042,808 B1 * 8/2018 Kulkarni ............ H03K 19/1778
(Continued)

FOREIGN PATENT DOCUMENTS

CN 1744068 A 3/2006
CN 105468563 A 4/2016
EP 3 660 692 B1 * 1/2021 ............. G06F 13/42

OTHER PUBLICATIONS

European Search Report dated Apr. 10, 2019 of corresponding European application No. 18208636.3; 5 pages.
(Continued)

*Primary Examiner* — Glenn A. Auve
(74) *Attorney, Agent, or Firm* — Maier & Maier, PLLC

(57) ABSTRACT

A single communication interface between a master device and at least one slave device and a method with internal/external addressing mode using the single communication interface. In the single communication interface between a master device and at least one slave device, the master device includes a master interface and the slave device comprises a slave interface and a slave bus-system, whereas the slave interface is directly connected to the slave bus-system, wherein the master interface and the slave interface communicate on a packet based protocol by an internal and external addressing mode inside the slave interface, whereas the addressing mode, data transfer direction and data address location are coded by the packet based protocol inside a first 32-bit word of each transmission between the master device and slave device over the single communication interface.

20 Claims, 1 Drawing Sheet

(56) References Cited

U.S. PATENT DOCUMENTS

| | | | |
|---|---|---|---|
| 2005/0010712 A1* | 1/2005 | Kim | G06F 13/404 |
| | | | 710/315 |
| 2005/0215248 A1* | 9/2005 | Brookshire | H04W 88/02 |
| | | | 455/426.1 |
| 2008/0104282 A1* | 5/2008 | Lee | G06F 13/385 |
| | | | 710/5 |
| 2008/0183928 A1* | 7/2008 | Devila | G06F 13/4291 |
| | | | 710/110 |
| 2009/0138638 A1 | 5/2009 | Russo et al. | |
| 2011/0016291 A1* | 1/2011 | Kuo | G06F 9/30076 |
| | | | 711/214 |
| 2018/0276157 A1 | 9/2018 | Lofamia et al. | |

OTHER PUBLICATIONS

International Search Report dated Aug. 16, 2019 in corresponding International application No. PCT/CN2019/075725; 2 pages.

* cited by examiner

| int_addr | wr | addr[31] | .. | .. | .. | addr[2] |
|---|---|---|---|---|---|---|
| 31 | 30 | 29 | .. | .. | .. | 0 |

SINGLE COMMUNICATION INTERFACE AND A METHOD WITH INTERNAL/EXTERNAL ADDRESSING MODE

CROSS-REFERENCE TO RELATED APPLICATIONS

This application is a continuation of International Application No. PCT/CN2019/075725, filed on Feb. 21, 2019, which claims priority to European Patent Application No. 18208636.3, filed on Nov. 27, 2018, the disclosures of the aforementioned applications are hereby incorporated by reference in their entireties.

FIELD

The disclosure discloses a single communication interface between a master device and at least one slave device and a method with internal/external addressing mode.

BACKGROUND

Master-Slave interfaces, like the serial peripheral interface (SPI), are communication interfaces between a master and one or more slave devices. The master device is responsible to initiate the communication. Normally, in a Master-Slave interface relation the Slave side is not able to initiate communication, or the Master side needs detailed memory location information.

If a slave device wants to transfer data, it must signalize its demand via an interrupt signal to the master device and the master device can initiate a transfer to read out the data from the slave device.

It is commonly known that Master-Slave interfaces can be half or full duplex.

Master-Slave interfaces are usually used for register access and data streaming

For register access, the slave device has implemented a register interface, where the master device transmits the command (read or write) and the address. In case of write accesses, the master device transmits the data and in case of read accesses the slave device transmits the requested data.

For streaming scenarios no addressing is used and application specific packets are transmitted.

Complex slave devices, like embedded systems with integrated processors, require a combination of two different modes: In a first mode the master device wants to access the internal register of the slave device (e.g. for debugging purpose). The word size is 32 bits and 32 bits wide addresses are used for byte addressing. In a second mode, the master device and slave device want to send application specific messages, where no addressing is needed. In both modes, the communication should be energy efficient. Thus, the integrated processor of the slave device should be involved in the communication as little as possible.

For common implementations used today, two main problems arise from these requirements: Firstly, the slave device can usually not initiate communication when it wants to send a message. As hardware protocols like SPI or I2C do usually not cater for this need, additional measures are required to give the slave device the opportunity to initiate a communication sequence. Secondly, for debug purposes the master device obviously needs to know the internals of the slave device, usually by having access to an address map. When just performing communication through messages, which often covers the practical use cases in the field, it is usually not desirable that the master device needs to know the message buffer memory locations, as they also might be changing within the available memory regions depending on software needs. It is therefore desirable to give the slave device the opportunity to configure the hardware interface in a way to automatically direct the messages to a proper location. This would make the communication interface leaner, more universal and independent from internal software changes. So the master device could still talk to the slave device but without the need to know about possible changes of the buffer locations e.g. through updates or different use cases.

SUMMARY

The object of the disclosure will be solved by a single communication interface between a master device and at least one slave device, whereas the master device comprises a master interface and the slave device comprises a slave interface and a slave bus-system, whereas the slave interface is directly connected to the slave bus-system, wherein the master interface and the slave interface communicate on a packet based protocol over the single communication interface by an internal and external addressing mode inside the slave interface, whereas the addressing mode, data transfer direction and data address location are coded by the packet based protocol inside a first 32-bit word of each transmission between the master device and slave device over the single communication interface.

The described interface connects two systems, where one system is the master and the other system is the slave. It is advantageous that the slave device has its own slave interface like a serial peripheral interface (SPI). Only the slave interface is directly connected to the bus system of the slave device. It can access all registers and memories of the slave device. It is no longer necessary that the master device has to know about the internals of the slave device or the message buffer memory locations inside the slave device.

The inventive single communication interface comprises registers like an IRQ status/clear register, an external addressing read/write indicator, an internal address read pointer and an internal address write pointer. This allows that a single interface can be used for internal and external addressing mode in an energy efficient way. The external addressing mode is used for register accesses, where the master device transmits the address and the direction (read or write). The internal addressing mode is used for application data, where the master device transmits only the direction (master to slave or slave to master transfer). There is only a minimal communication overhead: Only the addressing mode, the direction and the address have to be coded in one single 32-bit word.

Hence, in a preferred embodiment of the inventive single communication interface, a first significant bit of the 32-bit word decodes the addressing mode. A second significant bit of the 32-bit word decodes the data transfer direction. Bits 29 down to 0 in the 32-bit command word represent the address for the external addressing mode access, hence the bits 31 down to 2 of the internal slave device bus. The Bits 1 down to 0 can be omitted, as only word-aligned access are permitted, hence the lower 2 bits will always be zero and do not need to be transmitted by the master device.

In another preferred embodiment, the communication interface is implemented in a fully embedded system-on-chip. So it is not bound to external communication interfaces.

The object of the disclosure will also be solved by a method for communicating between a master device and at least one slave device using the inventive single communication interface, wherein each communication transfer is initiated by the master device and the master interface and the slave interface communicate on a packet based protocol initiating an internal and external addressing mode, whereas the slave interface manages autonomously an addressing to a slave system memory via a slave bus-system to which the slave interface is connected to.

All communication transfers are initiated by the master device. The slave device must accept all transfers from the master device. Internally to the slave device, the slave interface has direct memory access via the bus-system. Externally the slave interface supports burst modes with an auto address incrementation for consecutive multiple word accesses. Internally, these are translated into single bus transfers, as the external interface is about 1 to 2 orders of magnitude slower than the internal bus and excessive blocking times would result from initiating the bursts also internally.

In a preferred embodiment of the inventive method, each communication transfer starts with a 32-bit command word comprising two most significant bits representing the command of addressing mode and direction and a remaining 30-bits sequence representing a word address for external addressing mode access. This has the advantageous effect that there is only a minimal communication overhead—only the addressing mode, the direction and the address have to be coded in one single 32-bit word at the beginning of each communication transfer.

In another preferred embodiment, four communication modes are supported by the 2-bit command word part of the 32-bit word: "01" indicates an internal addressing mode read request meaning that the slave device transmits a message to the master; "11" indicates an internal addressing mode write request meaning that the master device transmits a message to the slave device; "00" indicates external addressing mode read request meaning that the master device does a read access on a slave bus-system of the slave device with a given address; "10" indicates external addressing mode write request meaning that the master device does a write access on the slave bus-system of the slave device with a given address. The external addressing mode is used for register accesses, where the master device transmits the address and the direction (read or write).

The internal addressing mode is used for application data, where the master device transmits only the direction (master to slave or slave to master).

In a further preferred embodiment of the inventive method, the slave device raises an interrupt if the slave device intents to transfer data to the master device, whereas the master device starts an internal addressing mode read request. This has the positive effect that the master device will be informed about new data from the slave device and does not need to poll a status register or the "slave-to-master data channel".

In an embodiment of the inventive method, an asynchronous communication is used. This has the positive effect that no specific timing is required for the communication between the master device and slave device.

Summarizing, the inventive single communication interface between a master device and at least one slave device and the inventive method have the advantages that due to the asynchronous communication, no specific timing is required. Furthermore, there exists non-blocking, which means that another party can continue communication until a ready/request IRQ is received. For the master device or the receiver device the message storage location is irrelevant, it just requests the needed content. With the inventive single communication interface a just-in-time handling can be realized, because no busy waiting/polling for readiness/requests is necessary. Another advantage is that any overlay protocol can be implemented in the packets, so no fixed length is needed. For the communication a very compact command structure is used, two bits for command and 30 bit for the word address. And last but not least, only a minimal control overhead exists if direct memory access (DMA) like incremental bursts are supported.

BRIEF DESCRIPTION OF THE DRAWINGS

The disclosure will be described in more detail using exemplary embodiments shown in the drawings.

DETAILED DESCRIPTION

Figures 1, 2:
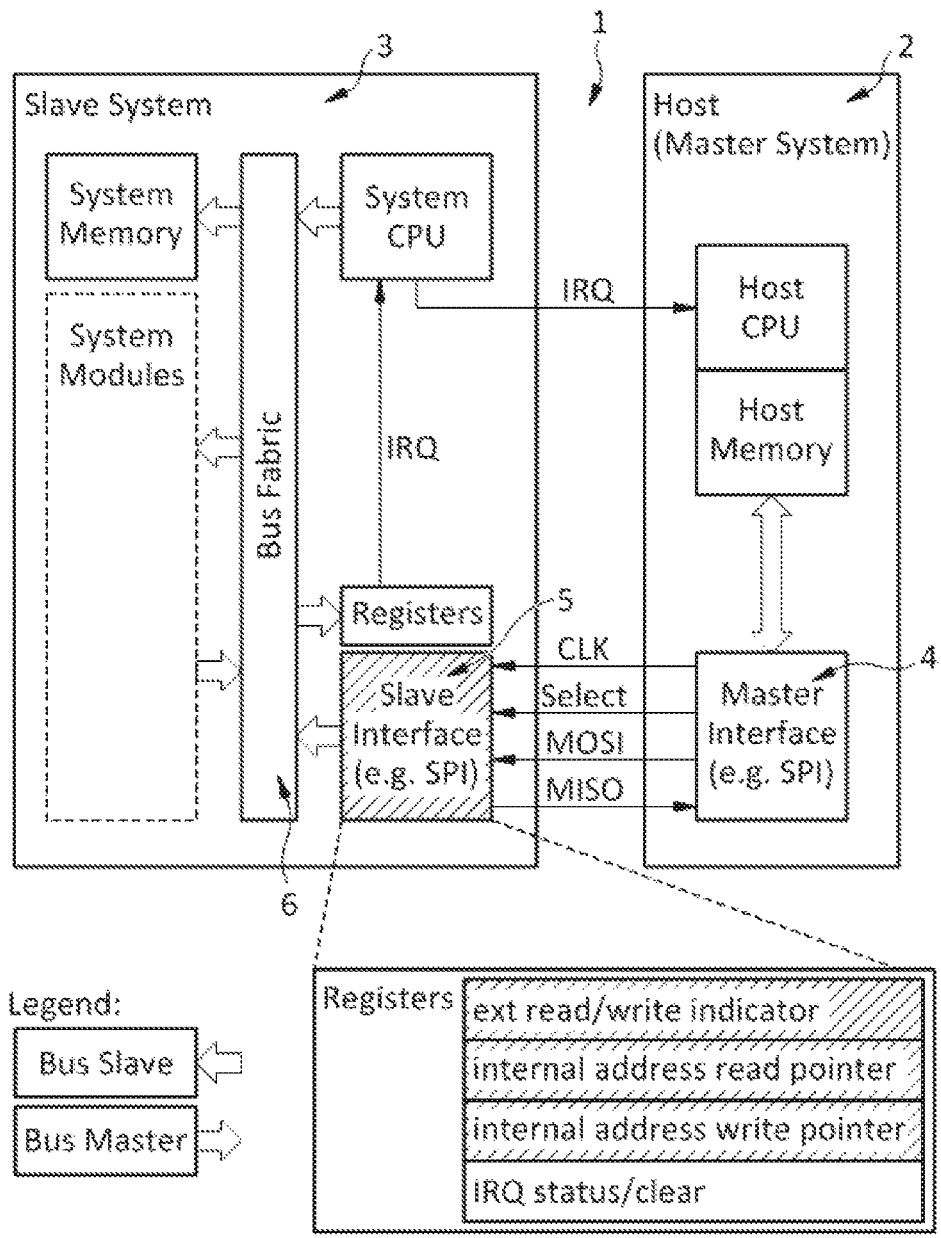
FIG. 1 System Example with SPI master slave interface.
FIG. 2 Command word structure.

FIG. 1 shows the inventive single communication interface 1 which connects two systems, where one system is the master 2 and the other is the slave 3. The slave device 3 has its own slave interface 5 like a serial peripheral interface (SPI). Only the slave interface 5 is directly connected to the bus system 6 of the slave device 3. It can access all registers and memories of the slave device 3. It is no longer necessary that the master device 2 has to know about the internals of the slave device 3 or the message buffer memory locations inside the slave device 3.

The inventive single communication interface 1 comprises registers like an IRQ status/clear register, an external addressing read/write indicator, an internal address read pointer and an internal address write pointer. This allows that a single interface 1 can be used for internal and external addressing mode in an energy efficient way. The external addressing mode is used for register accesses, where the master device transmits the address and the direction (read or write). The internal addressing mode is used for application data, where the master device 2 transmits only the direction (master to slave or slave to master transfer). There is only a minimal communication overhead: Only the addressing mode, the direction and the address have to be coded in one single 32-bit word.

Each communication transfer starts with a 32-bit command word comprising two most significant bits representing the command of addressing mode and direction and a remaining 30-bits sequence representing a word address for external addressing mode access, this is shown in FIG. 2. This has the advantageous effect that there is only a minimal communication overhead—only the addressing mode, the direction and the address have to be coded in one single 32-bit word at the beginning of each communication transfer.

Four communication modes are supported by the 2-bit command word part of the 32-bit command word: "01" indicates an internal addressing mode read request meaning that the slave device 3 transmits a message to the master device 2; "11" indicates an internal addressing mode write request meaning that the master device 2 transmits a message to the slave device 3; "00" indicates external addressing mode read request meaning that the master device 2 does a read access on a slave bus-system 6 of the slave device 3 with a given address; "10" indicates external addressing mode write request meaning that the master device 2 does a write access on the slave bus-system 6 of the slave device 3 with a given address. The external addressing mode is used for register accesses, where the master device 2 transmits the address and the direction (read or write).

What is claimed is:

1. A single communication interface between a master device and at least one slave device, comprising: the master device comprises a master interface and the slave device comprising a slave interface and a slave bus-system, the slave interface is directly connected to the slave bus-system, the master interface and the slave interface communicate with each other using a packet based protocol with an internal and external addressing mode inside the slave interface, and the addressing mode, data transfer direction and data address location are coded by the packet based protocol inside a first 32-bit word of each transmission between master device and slave device.

2. The single communication interface between a master device and at least one slave device according to claim 1, wherein a first most significant bit of the 32-bit word represents the addressing mode.

3. The single communication interface between a master device and at least one slave device according to claim 1, wherein a second most significant bit of the 32-bit word represents the data transfer direction.

4. The single communication interface between a master device and at least one slave device according to claim 1, wherein bits 29 down to 0 of the 32-bit word represents an address for an external addressing mode access.

5. The single communication interface between a master device and at least one slave device according to claim 1, wherein the communication interface is implemented in a fully embedded system-on-chip.

6. The single communication interface between a master device and at least one slave device according to claim 1, wherein the single communication interface comprises registers.

7. The single communication interface between a master device and at least one slave device according to claim 6, wherein the registers comprise an interrupt request (IRQ) status/clear register, an external addressing read/write indicator, an internal address read pointer and an internal address write pointer.

8. The single communication interface between a master device and at least one slave device according to claim 1, wherein the external addressing mode is used for register accesses.

9. The single communication interface between a master device and at least one slave device according to claim 1, wherein, the slave interface supports an externally initiated communication transfer in a burst mode, whereas an auto address incrementation is used in the burst mode for consecutive multiple word accesses and, the communication transfer is translated by the slave interface into single bus transfers.

10. A method for communicating between a master device and at least one slave device using the single communication interface according to claim 1, comprising: initiating, by the master device, each communication transfer wherein the master interface and the slave interface communicate with each other using a packet based protocol with an internal and external addressing mode, whereas the slave interface manages autonomously an addressing to a slave system memory via a slave bus-system to which the slave interface is connected to.

11. The method for communicating between a master device and at least one slave device according to claim 10, wherein each communication transfer starts with a 32-bit word comprising two most significant bits representing a command of addressing mode and direction and remaining 30-bits representing an address for an external addressing mode access.

12. The method for communicating between a master device and at least one slave device according to claim 11, wherein four communication modes are supported by the two most significant bits: "01" internal addressing mode read request meaning the slave device transmits a message to the master device; "11" internal addressing mode write request meaning the master device transmits a message to the slave device; "00" external addressing mode read request meaning the master device does a read access on a slave bus-system of the slave device with a given address; "10" external addressing mode write request meaning the master device does a write access on the slave bus-system of the slave device with a given address.

13. he method for communicating between a master device and at least one slave device according to claim 12, wherein the internal addressing mode is used for application data where the master device transmits only the direction.

14. The method for communicating between a master device and at least one slave device according to claim 12, further comprising: raising, by the slave device, an interrupt before the slave device transfers data to the master device, causing the master device to start the internal addressing mode read request.

15. The method for communicating between a master device and at least one slave device according to claim 11, wherein the external addressing mode is used for register accesses where the master device transmits the address and the direction.

16. The method for communicating between a master device and at least one slave device according to claim 10, wherein an asynchronous communication is used.

17. The method for communicating between a master device and at least one slave device according to claim 10, wherein the single communication interface comprises registers.

18. The method for communicating between a master device and at least one slave device according to claim 17, wherein the registers comprise an interrupt request (IRQ) status/clear register, an external addressing read/write indicator, an internal address read pointer and an internal address write pointer.

19. The method for communicating between a master device and at least one slave device according to claim 10, wherein the external addressing mode is used for register accesses where the master device transmits the address and the direction.

20. The method for communicating between a master device and at least one slave device according to claim 10, further comprising: initiating, externally to the slave interface, a communication transfer in a burst mode, whereas an auto address incrementation is used in the burst mode for consecutive multiple word accesses and, the communication transfer is translated by the slave interface into single bus transfers.

* * * * *